No. 659,545. Patented Oct. 9, 1900.
F. A. PLACEK.
GRAIN DRILL.
(Application filed Feb. 20, 1900.)

(No Model.)

WITNESSES:

INVENTOR
Frank A. Placek
BY
ATTORNEYS

THE NORRIS PETERS CO., PHOTO-LITHO., WASHINGTON, D. C.

UNITED STATES PATENT OFFICE.

FRANK A. PLACEK, OF MILLIGAN, NEBRASKA.

GRAIN-DRILL.

SPECIFICATION forming part of Letters Patent No. 659,545, dated October 9, 1900.

Application filed February 20, 1900. Serial No. 5,912. (No model.)

*To all whom it may concern:*

Be it known that I, FRANK A. PLACEK, a citizen of the United States, residing at Milligan, in the county of Fillmore and State of Nebraska, have invented a new and Improved Grain-Drill, of which the following is a full, clear, and exact description.

One object of the invention is to provide a grain-drill which will work equally well in hard, soft, trashy, or stubble ground and in which a sharp diamond-shaped runner and a shovel will be combined with the grain-tube.

A further object of the invention is to so construct the outlet of the grain-tube that the seed will be delivered therefrom in two distinct and parallel rows, thus adding materially to the possibilities of an abundant growth.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
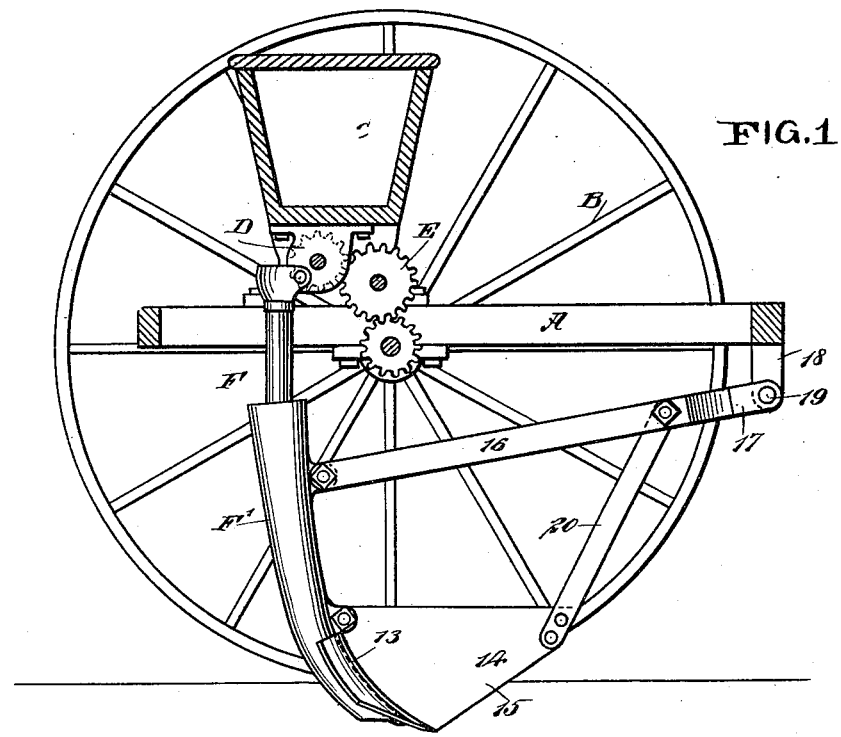
Figure 2:
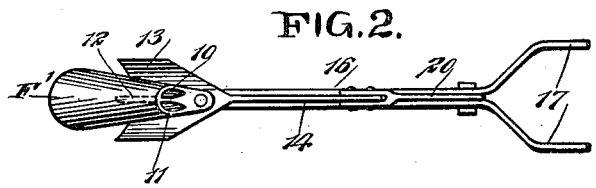
Figure 3:
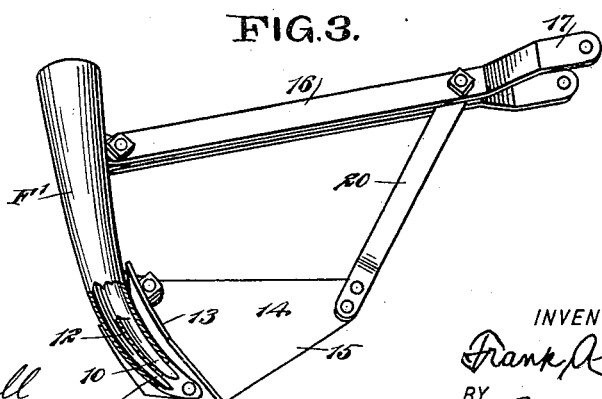

Figure 1 is a longitudinal vertical section through a portion of the planter having the improvement applied, the drill and its connections being shown in side elevation. Fig. 2 is an inverted plan view of the grain tube or drill and its connections; and Fig. 3 is a perspective view of the parts shown in Fig. 2, a portion of the lower part of the grain-tube being broken away.

A represents a portion of the frame of a planter; B, one of the supporting-wheels; C, the seedbox; D, the seed-drop mechanism; E, the driving-gear for the seed-drop mechanism, and F a boot which receives seed from the seed-dispensing mechanism, which boot enters the grain-tube F' in the usual way. The lower end of the grain-tube F' is curved in a forward direction, and two openings 10 and 11 are formed at the bottom of the grain-tube by the introduction of a partition 12, which extends from the bottom of the tube to any desired point within the same, the edges of the partition facing in direction of the front and the rear of the machine, as shown best in Fig. 2. Thus it will be observed that the seed leaves the grain-tube through two distinct openings, and is consequently delivered on the ground in parallel rows.

A shovel 13 is secured to the lower front portion of the grain-tube. The point of the shovel extends below the lower end of the grain-tube and is adapted to enter the ground, and the sides of the shovel extend rearwardly beyond the sides of the grain-tube, as illustrated in Figs. 1 and 2. A diamond-shaped runner 14 is secured at its rear end to the central portion of the shovel, and preferably to the grain-tube above the shovel, and the lower portion of the rear edge of the runner extends to the point of the shovel, while the forward lower edge 15 of the runner is sharp and is upwardly and forwardly inclined. This edge 15 is the cutting edge and is adapted to enter the ground and cut any trash or stubble that may be in the path of the shovel or furrow-opener.

Two parallel brace-beams 16 are preferably pivoted to the forward face of the grain-tube, near its upper end, and the forward ends of these brace-beams are bent outward in opposite directions to form a fork 17, and the fork receives a hanger 18, extending downward from the frame, and the braces are pivoted to this hanger by a suitable pin 19. A lower brace 20 is attached to the upper braces 16 and likewise to the upper forward portion of the runner 14, the lower end of the brace 20 being also preferably forked. Thus it will be observed that under the construction above set forth the runner clears the way for the shovel, the shovel opens the furrow, and the grain-tube delivers the seed into the furrow in two distinct and parallel rows.

Having thus described my invention, I claim as new and desire to secure by Letters Patent—

1. In a planter, a grain-tube, a shovel secured to the bottom of the said tube, and a runner secured to the center of the said shovel, extending forwardly therefrom and having its lower edge inclined upwardly and sharpened.

2. In a planter, a grain-tube, a shovel secured to the forward lower portion of the grain-tube, the point of the shovel extending beyond the lower end of the tube, and a diamond-shaped runner secured to the central portion of the said shovel, extending from its point to its upper edge, the forward lower edge of which runner is sharpened and upwardly and forwardly inclined.

3. In a planter, a grain-tube provided with a longitudinal partition extending from the front to the rear of the tube, whereby two distinct delivery-openings are obtained for delivering the seed on the ground in parallel rows, a shovel secured to the forward face of the lower portion of the grain-tube, the point of the shovel extending beyond the lower edge of the grain-tube, a runner secured longitudinally to the central portion of the shovel, extending upward from its point, the said runner being provided with a lower upwardly and forwardly inclined working surface connecting with the point of the shovel, and means, substantially as described, for supporting the forward end of the shovel and connecting the grain-tube with the frame of a planter, as set forth.

In testimony whereof I have signed my name to this specification in the presence of two subscribing witnesses.

FRANK A. PLACEK.

Witnesses:
FRANK MINGLES, Jr.,
C. H. VOLLBEHR.